Patented Jan. 19, 1954

2,666,208

UNITED STATES PATENT OFFICE 2,666,208

PROSTHETIC STOCKING

Dorothy B. Funk, Burbank, Calif.

No Drawing. Application July 25, 1950,
Serial No. 175,879

9 Claims. (Cl. 2—267)

This invention relates to prosthetic stockings and to processes for making the same.

One of the principal objects of my invention is to provide a novel stocking to be worn by amputees, sufferers from varicose veins, infantile paralysis, scars and other disfigurements caused by accident or disease.

Another object of my invention is to provide a stocking of the character described above which is adapted to be worn under conventional stockings and which, when so worn will completely cover and hide such disfigurements, presenting the appearance of natural, unblemished flesh under even the sheerest of stockings.

Another object of my invention is to provide a prosthetic stocking which is resilient and completely opaque, yet which is extremely thin and light in weight.

A further object of my invention is to provide a stocking of the type described which is comfortable to wear, being provided with a plurality of minute air holes or apertures.

Yet another object of my invention is to provide novel processes for making stockings of the character described above.

Other objects and advantages of my invention it is believed will be readily apparent from the following detailed description of preferred embodiments thereof.

Presently available prosthetic stockings are generally unsatisfactory due to their bulk and the resultant failure to present a realistic flesh-like appearance when worn in the usual manner under conventional stockings, especially where the outer stockings are of the very sheer type, generally preferred. Efforts to prepare elastic stockings which are opaque, yet sufficiently thin to be unnoticeable under sheer outer stockings, have heretofore not succeeded. This may be due in part to the fact that attempts have been made to apply, by dipping or otherwise, a mixture of latex or other like material and a filler to render the latex opaque. In order to obtain the desired opaqueness, a large quantity of filler material must be added to the latex, resulting in a viscous material which in turn produces a thick, heavy coating.

I have found that the desired results may be obtained by applying separate, alternate layers of latex or similar rubber-like material and of filler and coloring material. In this manner, very thin and light, yet completely opaque stockings may be prepared, due in part to the fact that a smaller proportion of filler material is needed to render opaque a given quantity of latex.

In making stockings in accordance with my invention, I prefer to use as a base therefor commercially available sheer (i. e., 45 gage, 15 denier) "nylon" stockings of the run-resistant type, although silk or other materials may be used. The stocking is placed, inside out, on a form in the shape of a leg. The form may be of any desired suitable material, but it is essential that the surface thereof be hard and smooth.

To this base stocking is applied a first coating of rubber latex. While the choice of latex is not critical, I prefer to use a vulcanized latex, that is, one which is pre-cured and with which vulcanized films may be prepared by allowing drying to take place without heat, as is well known to those skilled in the art. The latex is a commercially available product having a dry rubber content of approximately 60% by weight. A first coat of this latex is applied to the base stocking by brushing, although the application may be by dipping or spraying if desired. This coating is then dried for approximately thirty minutes in sunlight or under low heat. Then the filler and coloring material, in the form of a fine powder, is brushed or otherwise applied onto the first latex coating to thoroughly saturate the same.

The filler or "opaqueness producer" and coloring material preferably consists of the following mixture, in the proportions by weight indicated:

| | Parts |
|---|---|
| Talc (300 mesh) | 48 |
| Burnt Sienna | 1 |
| Ochre | 3 |

Filler materials or opaqueness producers other than talc may be used, such as chalk, bentonite or other finely divided, inert materials. The Burnt Sienna and Ochre are incorporated to produce a flesh-colored coating; other inorganic or organic coloring materials or pigments may of course be used and in varying proportions, depending upon the shade desired.

A second coat of latex is then applied, allowed to dry, and a second coat of filler and coloring material applied thereto. In this manner, successive coats or layers of latex and powdered material are built up on the base stocking, until the desired thickness and opaqueness has been obtained. I have found that for the second and successive coatings of latex, a more dilute latex is preferable. This is obtained by diluting the concentrated latex with distilled water in the ratio of about one part latex to four parts water by volume. Satisfactory stockings have been made using this diluted latex for all of the layers, including the first, but it appears more desirable to use the concentrated latex for the first layer to form a relatively heavy and firm base coat.

The number of layers depends, of course, upon the stocking thickness and opaqueness desired, but I have made satisfactory stockings using as few as three latex layers and as many as nine. For general purposes, six layers has been found to be preferable.

The last layer consists of a coat of the powdered filler and coloring material. The stocking is then carefully stripped from the form, starting at the top and thus turning the stocking right side out, since as was pointed out above, the base stocking is originally placed on the form inside out. Simultaneously with the stripping operation, the "right" or outer side of the stocking is liberally coated with the powder.

I have found that a porous stocking may be made by substituting for the talc an hydrophobic comminuted material, such as facial powder which contains an oil base powder. These substances are not readily wet by water and because of this property the successive applications of water-dispersed rubber or latex do not result in an impervious coating but rather a coating having a multiplicity of very minute apertures. These apertures are not so large as to destroy the opaqueness of the finished stocking but are sufficiently large and numerous to permit the entrance of air therethrough to greatly aid the comfort of the wearer.

It will be readily apparent to those skilled in the art that rubber-like materials other than latex may be used in making stockings in accordance with my invention, such as, for example dissolved (i. e., in organic solvents) rubber, synthetic rubbers and other synthetic film-forming elastomers.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A prosthetic stocking comprising a sheer fabric base coated on one side with alternate layers of rubber-like material and of a filler material to render the stocking opaque.

2. A prosthetic stocking comprising a sheer fabric base coated on one side with alternate layers of rubber-like material and of a filler and coloring material to render the stocking opaque, and flesh colored.

3. A prosthetic stocking comprising a base stocking of sheer material coated on one side with a plurality of alternate layers of vulcanized latex and of a powdered filler material to render the stocking opaque, said filler including a hydrophobic material.

4. A prosthetic stocking comprising a base stocking of sheer material coated on one side with a plurality of alternate layers of vulcanized latex and of a powdered filler and coloring material to render the stocking opaque, and flesh colored.

5. A prosthetic stocking comprising a sheer fabric base coated on one side with alternate layers of rubber-like material and of a filler material to render the stocking opaque, said stocking being provided with a plurality of minute apertures therein.

6. A prosthetic stocking comprising a base stocking of sheer material coated on one side with a plurality of alternate layers of vulcanized latex and of a powdered filler material to render the stocking opaque, said prosthetic stocking being provided with a plurality of minute apertures therein.

7. A prosthetic stocking comprising a sheer fabric base coated on one side with alternate layers of rubber-like material and of a filler material to render the stocking opaque, said stocking having a plurality of apertures therein, the apertures being sufficiently small to preserve the opaqueness of said stocking but sufficiently large to permit the passage of air therethrough.

8. A prosthetic stocking comprising a base stocking of sheer material coated on one side with a plurality of alternate layers of vulcanized latex and of a powdered filler material to render the stocking opaque, said prosthetic stocking having a plurality of apertures therein, the apertures being sufficiently small to preserve the opaqueness of said stocking but sufficiently large to permit the passage of air therethrough.

9. A prosthetic stocking comprising a sheer fabric base coated on one side with alternate layers of vulcanized latex and of a filler material to render the stocking opaque, said vulcanized latex being itself substantially free from fillers and pigments.

DOROTHY B. FUNK.

References Cited in the file of this patent

UNITED STATES PATENTS

| Number | Name | Date |
|---|---|---|
| 1,972,976 | Burnham et al. | Sept. 11, 1934 |
| 1,979,130 | Wiley | Oct. 30, 1934 |
| 2,020,256 | Copeman | Nov. 5, 1935 |
| 2,100,029 | Gammeter | Nov. 23, 1937 |
| 2,120,713 | Rottke et al. | June 14, 1938 |
| 2,120,722 | Tillotson | June 14, 1938 |
| 2,345,939 | Leary | Apr. 4, 1944 |
| 2,501,903 | Huggins | Mar. 28, 1950 |
| 2,592,602 | Saks | Apr. 15, 1952 |